(12) United States Patent
Kobayashi

(10) Patent No.: US 6,708,182 B1
(45) Date of Patent: Mar. 16, 2004

(54) PORTABLE ELECTRONIC APPARATUS AND MESSAGE PROCESSING METHOD FOR DECODING PROCESSING FOR MESSAGE FORMATS

(75) Inventor: Tsutomu Kobayashi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/404,782

(22) Filed: Sep. 24, 1999

(30) Foreign Application Priority Data

Sep. 25, 1998  (JP) ............................. 10-271300

(51) Int. Cl.⁷ ............................................. G06F 17/30
(52) U.S. Cl. .................. 707/104.1; 707/10; 707/101; 713/201
(58) Field of Search ................. 707/1, 3, 5, 7, 707/103 R, 200, 104.1, 10; 705/1, 71; 455/41, 406; 340/825; 708/109; 710/65; 713/153, 201, 227, 170, 185

(56) References Cited

U.S. PATENT DOCUMENTS

| 4,575,621 | A |   | 3/1986 | Dreifus ....................... 235/380 |
| 4,924,514 | A |   | 5/1990 | Matyas et al. ................. 705/71 |
| 5,459,458 | A | * | 10/1995 | Richardson et al. ........ 708/109 |
| 5,678,029 | A |   | 10/1997 | Iijima ........................... 710/65 |
| 6,324,114 | B1 | * | 11/2001 | Himeno ................. 365/230.03 |
| 6,353,736 | B1 | * | 3/2002 | Hiromichi ................... 455/406 |
| 2002/0037700 | A1 | * | 3/2002 | Dooley et al. ................ 455/41 |

FOREIGN PATENT DOCUMENTS

| EP | 0354 771 A2 | 2/1990 |
| EP | 0 681 254 A1 | 11/1995 |
| EP | 0 858 201 A2 | 8/1998 |

* cited by examiner

Primary Examiner—Charles Rones
Assistant Examiner—Hassan Mahmoudi
(74) Attorney, Agent, or Firm—Pillsbury Winthrop LLP

(57) ABSTRACT

A message processing arrangement includes an arrangement for receiving a message, identifying a message format, and decoding a command of the received message on the basis of the message format identified, and then processing the message in accordance with the decoded command.

6 Claims, 3 Drawing Sheets

PORTABLE ELECTRONIC APPARATUS AND MESSAGE PROCESSING METHOD FOR DECODING PROCESSING FOR MESSAGE FORMATS

BACKGROUND OF THE INVENTION

The present invention relates to a portable electronic apparatus such as an IC card which receives externally transmitted messages and executes various processes in accordance with commands contained in the received messages, and a message processing method.

IC cards are expected to come into wide use in the future. With this expectation, various proposals have been made concerning IC cards. In general, important data demanding high security, e.g., a password, is often stored in an IC card. In rewriting such important data demanding high security, as techniques of protecting the important data against interception or tampering by a third party, for example, the following are known: a technique of encrypting the data string of the important data; and a technique of adding auxiliary data for a validity check to the important data.

The above techniques are defined by commands. One IC card can use only one type of message format. Assume that the execution of the technique of encrypting data strings or the technique of adding auxiliary data is defined by a command in a given IC card. In this IC card, therefore, even when the data is to be rewritten into data with low security, the technique of encrypting data strings or the technique of adding auxiliary data is used.

BRIEF SUMMARY OF THE INVENTION

The present invention has been made to solve the above problem, and has as its object to provide a portable electronic apparatus and message processing method which can decode a plurality of message formats.

According to the present invention, there is provided a portable electronic apparatus comprising reception means for receiving a message, identification means for identifying a message format of the message received by the reception means, and processing means for decoding a command of the message received by the reception means on the basis of the message format identification result obtained by the identification means, and performing processing in accordance with the decoded command.

In addition, according to the present invention, there is provided a message processing method comprising the first step of receiving a message, the second step of identifying a message format of the message received in the first step, and the third step of decoding a command of the message received in the first step on the basis of the message format identification result obtained in the second step, and performing processing in accordance with the decoded command.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the views of the accompanying drawing. In this case, a portable electronic apparatus of the present invention is applied to an IC card.

Figure 1:
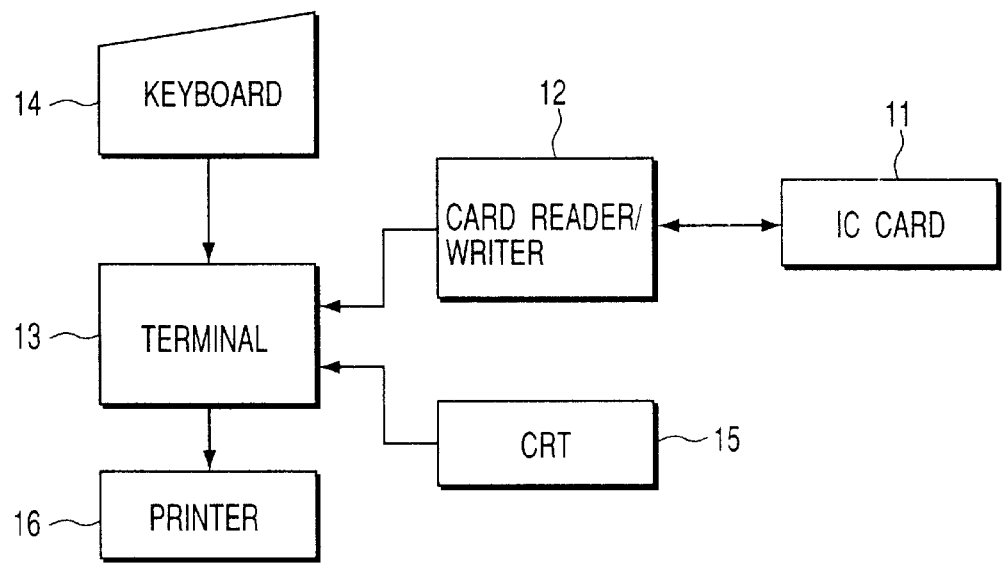
FIG. 1 is a block diagram showing the schematic arrangement of an IC card processing system for processing an IC card.

FIG. 1 is a block diagram showing the schematic arrangement of an IC card processing system for processing an IC card. As shown in FIG. 1, the IC card processing system is comprised of an IC card 11, card reader/writer 12, terminal 13, keyboard 14, display (CRT display) 15, printer 16, and the like. That is, this IC card processing system allows the IC card 11 to be connected to the terminal 13 through the card reader/writer 12, and the keyboard 14, display 15, and printer 16 are connected to the terminal 13.

Figure 2:
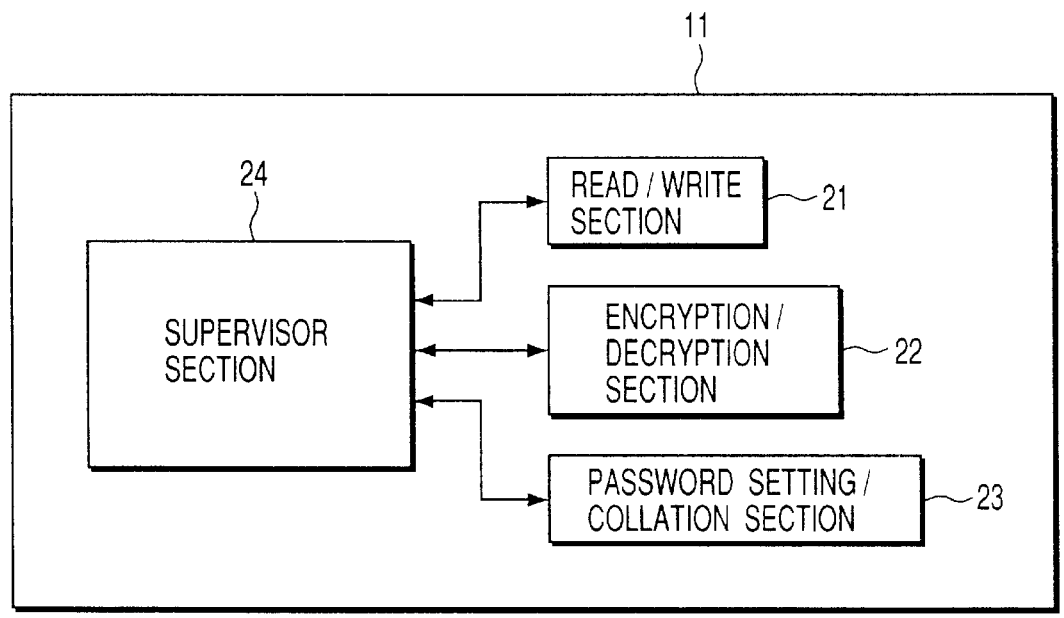
FIG. 2 is a block diagram schematically showing the functions of the IC card.

The functions of the IC card 11 will be briefly described next with reference to FIG. 2. As shown in FIG. 2, the functions of the IC card 11 are implemented by a read/write section (R/W) 21, encryption/decryption section 22, password setting/collation section 23, and supervisor section 24. The read/write section (R/W) 21, encryption/decryption section 22, and password setting/collation section 23 serve to implement the basic function. The supervisor section 24 supervises the basic function and serves to decode and execute a function code or function with data, which is input through the card reader/writer 12.

Figure 3:
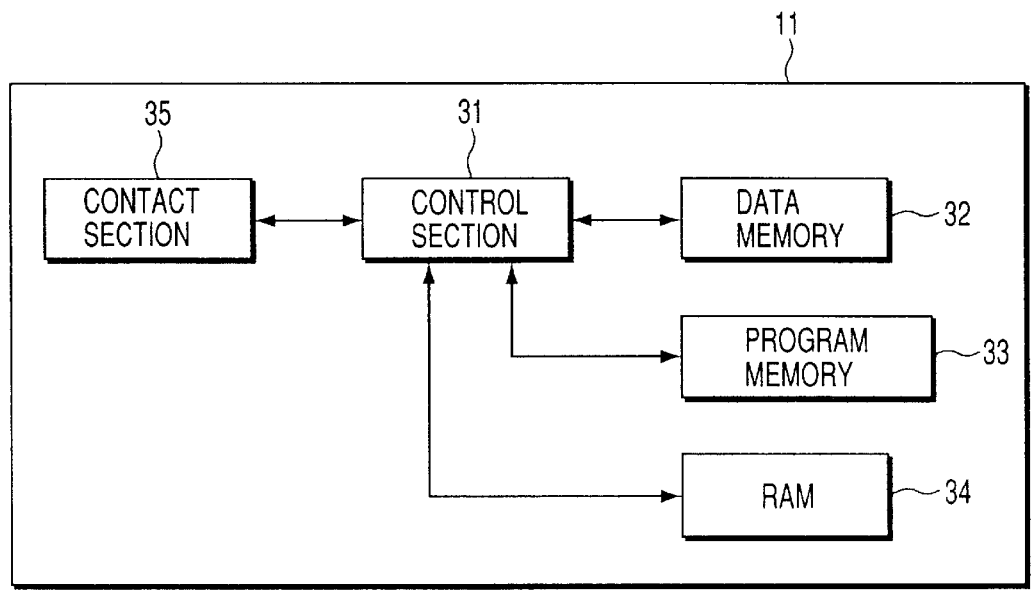
FIG. 3 is a block diagram showing the schematic arrangement of the IC card.

To perform these functions, the IC card 11 has an arrangement like the one shown in FIG. 3. The IC card 11 is comprised of a control section 31, data memory 32, program memory 33, RAM 34, contact section 35, and the like. The program memory 33 is a mask ROM in which various programs are stored. The data memory 32 is an EEPROM, which is used to store various data.

Figure 4:
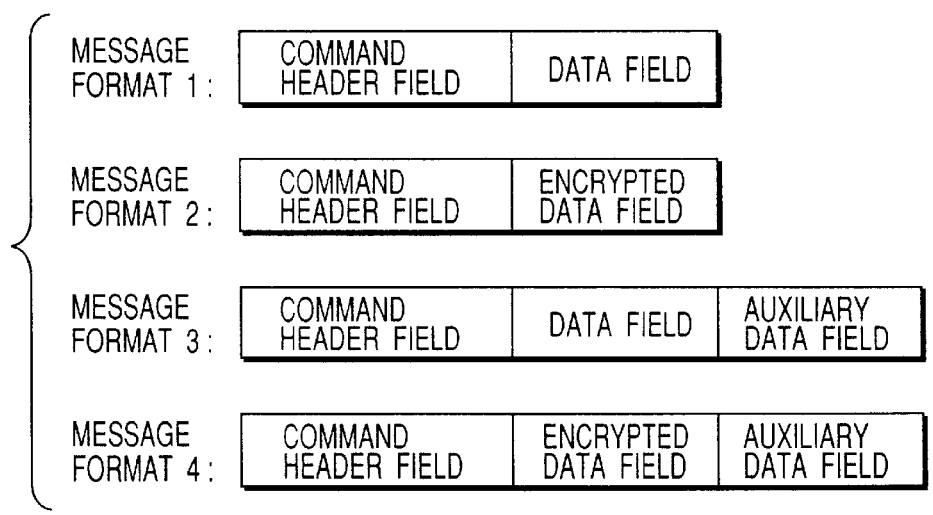
FIG. 4 is a view for explaining several message formats transmitted to the IC card through an external device (card reader/writer)

Various message formats sent to the IC card 11 through an external device (card reader/writer 12) will be described next with reference to FIG. 4. The IC card 11 (control section 31) decodes the functions designated by the command header fields of all message formats 1 to 4 shown in FIG. 4.

Message format 1 is a format having a command header field and data field. In general, this message format 1 is transmitted from an external device (card reader/writer 12).

Message format 2 is a format having a command header field and encrypted data field. Upon reception of message format 2, the IC card 11 decrypts the encrypted data field contained in message format 2 and converts (reconstructs) it into message format 1. Decryption is performed by the encryption/decryption section 22.

Message format 3 is a format having a command header field, data field, and auxiliary data field for guaranteeing the data field. Upon reception of message format 3, the IC card 11 performs a validity check on the data field by using the auxiliary data field contained in message format 3. Upon determining that the data field is valid, the IC card 11 deletes the auxiliary data field and converts (reconstructs) message format 3 into message format 1.

Message format 4 is a format having a command header field, encrypted data field, and auxiliary data field for guaranteeing the encrypted data field. Upon reception of message format 4, the IC card 11 performs a validity check on the encrypted data field by using the auxiliary data field contained in message format 4. Upon determining that the data field is valid, the IC card 11 deletes the auxiliary data field, decrypts the encrypted data field, and converts (reconstructs) the message into message format 1.

Figure 5:
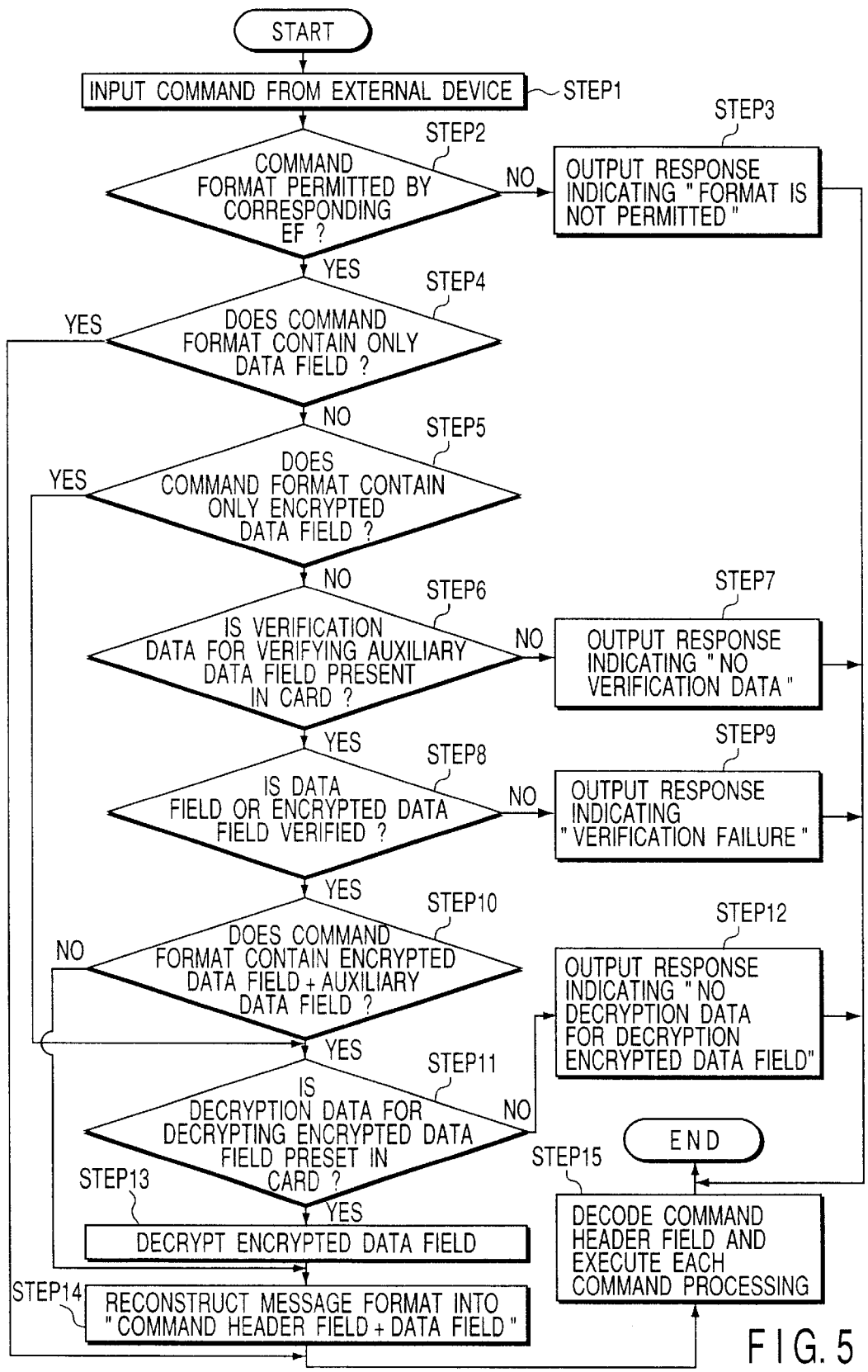
FIG. 5 is a flow chart for explaining message processing in the IC card.

Data processing in the IC card 11 will be described next with reference to the flow chart of FIG. 5.

STEP 1: The IC card 11 receives a message transmitted from an external device (card reader/writer 12) through the contact section 35.

STEP 2: The control section 31 identifies a specific one of message formats 1 to 4 in FIG. 4 which is permitted by a work file for the received message. If the received message is permitted, the flow advances to STEP 4. Otherwise, the flow advances to STEP 3.

STEP 3: The control section 31 of the IC card 11 outputs a response indicating "format is not permitted" to the external device.

STEP 4: The control section 31 of the IC card 11 checks whether the message format of the received message is message format 1. If the message format of the received message is message format 1, the flow advances to STEP 15. Otherwise, the flow advances to STEP 5.

STEP 5: The control section 31 of the IC card 11 checks whether the message format of the received message is message format 2. If the message format of the received message is message format 2, the flow advances to STEP 11. Otherwise, the flow advances to STEP 6.

STEP 6: The control section 31 of the IC card 11 checks whether verification data (e.g., an encryption key) for verifying the auxiliary data field is set. If the verification data is set, the flow advances to STEP 8. Otherwise, the flow advances to STEP 7.

STEP 7: The control section 31 of the IC card 11 outputs a response indicating "no verification data" to the external device.

STEP 8: The control section 31 of the IC card 11 verifies the data field or encrypted data field by using the auxiliary data. If the control section 31 determines that the data field or encrypted data field is valid, the flow advances to STEP 10. Otherwise, the flow advances to STEP 9.

STEP 9: The control section 31 of the IC card 11 outputs a response indicating "verification failure" to the external device.

STEP 10: The control section 31 of the IC card 11 checks whether the message format of the received message is message format 4. If the message format of the received message is message format 4, the flow advances to STEP 11. Otherwise, the flow advances to STEP 14.

STEP 11: The control section 31 of the IC card 11 checks whether decryption data (e.g., a decryption key) for decrypting the encrypted data field of the received message is set. If the decryption data is set, the flow advances to STEP 13. Otherwise, the flow advances to STEP 12.

STEP 12: The control section 31 of the IC card 11 outputs a response indicating "no decryption data for decrypting encrypted data field" to the external device.

STEP 13: The control section 31 of the IC card 11 decrypts the encrypted data field by using the decryption data.

STEP 14: The control section 31 of the IC card 11 converts (reconstructs) the message format of the received message into a format of "command header field+data field" which is identical to message format 1.

STEP 15: The control section 31 of the IC card 11 decodes the command header field and executes processing in accordance with each command.

As has been described above, according to the present invention, a portable electronic apparatus and message processing method which can use a plurality of message formats can be provided. This makes it possible to apply a format with high safety to data with high security and apply a format with low safety to data with low security.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable electronic apparatus comprising:

reception means for receiving a message;

identification means for identifying a message format of the message received by said reception means; and processing means for decoding a command of the message received by said reception means on the basis of the message format identification result obtained by said identification means, and performing processing in accordance with the decoded command; wherein said identification means includes message format identification means for identifying a specific one of a first message format containing a command header field and data field and a second message format containing a command header field, data field, and auxiliary data field for guaranteeing validity of the data field to which the message received by said reception means corresponds; and said processing means includes verification means for verifying the data field on the basis of the auxiliary data field, first processing means for, when said message format identification means determines that the received message corresponds to the first message format, decoding the command header field contained in the received message, and performing processing in accordance with a command indicated by the command header field, and second processing means for, when said message format identification means determines that the received message corresponds to the second message format, causing said verification means to verify the data field contained in the received message on basis of the auxiliary data field contained in the received message, converting the received message into the first message format, provided that the data field is verified, decoding the command header field contained in the converted message, and performing processing in accordance with a command indicated by the command header field.

2. A portable electronic apparatus comprising:

reception means for receiving a message;

identification means for identifying a message format of the message received by said reception means; and processing means for decoding a command of the message received by said reception means on the basis of the message format identification result obtained by said identification means, and performing processing in accordance with the decoded command; wherein said identification means includes message format identification means for identifying a specific one of a first message format containing a command header field and data field and a second message format containing a command header field, encrypted data field, and auxiliary data field for guaranteeing the encrypted data field to which the message received by said reception means corresponds; and said processing means includes decryption means for decrypting the encrypted data field, verification means for verifying the encrypted data field on the basis of the auxiliary data field, first processing means for, when said message format identification means determines that the received message corresponds to the first message format, decoding the command header field contained in the received message, and performing processing in accordance with a command indicated by the command header field, and second processing means for, when said message format identification means determines that the received message corresponds to the second message format, causing said verification means to verify the data field contained in the received message on basis of the auxiliary data field contained in the received message, causing said decryption means to decrypt the encrypted data field, provided that the encrypted data is verified, converting the received message into the first message format, decoding the command header field contained in the converted message, and performing processing in accordance with a command indicated by the command header field.

3. A portable electronic apparatus comprising:

reception means for receiving a message;

identification means for identifying a message format of the message received by said reception means; and processing means for decoding a command of the message received by said reception means on the basis of the message format identification result obtained by said identification means, and performing processing in accordance with the decoded command; wherein said identification means includes message format identification means for identifying a specific one of a first message format containing a command header field and data field, a second message format containing a command header field and encrypted data field, a third message format containing a command header field, data field, and auxiliary data field for guaranteeing validity of the encrypted data field, a fourth message format containing a command header field, encrypted data field, and auxiliary data field for guaranteeing the encrypted data field to which the message received by said reception means corresponds; and said processing means includes decryption means for decrypting the encrypted data field, verification means for verifying the encrypted data field on the basis of the auxiliary data field, first processing means for, when said message format identification means determines that the received message corresponds to the first message format, decoding the command header field contained in the received message, and performing processing in accordance with a command indicated by the command header field, and second processing means for, when said message format identification means determines that the received message corresponds to the second message format, causing said decryption means to decrypt the encrypted data field contained in the received message, converting the received message into the first message format, and performing processing in accordance with a command indicated by the command header field, third processing means for, when said message format identification means determines that the received message corresponds to the third message format, causing said verifications means to verify the data field contained in the received message on the basis of the auxiliary data field contained in the received message, converting the received message into the first message format provided that the data field is verified, decoding the command header field contained in the converted message, and performing processing in accordance with a command indicated by the command header field, and fourth processing means for, when said message format identification means determines that the received message corresponds to the fourth message format, causing said verification means to verify the encrypted data field contained in the received message on the basis of the auxiliary data field contained in the received message, causing said decryption means to decrypt the encrypted data field provided that the encrypted data is verified, converting the received message into the first message format, decoding the command header field contained in the converted message, and performing processing in accordance with a command indicated by the command header field.

4. A message processing method comprising:

a first step of receiving a message;

a second step of identifying a message format of the message received in the first step; and a third step of decoding a command of the message received in the first step on the basis of the message format identification result obtained in the second step, and performing processing in accordance with the decoded command; wherein the second step includes a fourth step of identifying a specific one of a first message format containing a command header field and data field and a second message format containing a command header field, data field, and auxiliary data field for guaranteeing validity of the data field to which the message received in the first step corresponds; and the third step includes a fifth step of, when it is determined in the fourth step that the received message corresponds to the first message format, decoding the command header field contained in the received message, and performing processing in accordance with a command indicated by the command header field, and the sixth step of, when it is determined in the fourth step that the received message corresponds to the second message format, verifying the data field contained in the received message on the basis of the auxiliary data field contained in the received message, converting the received message into the first message format provided that the data field is verified, decoding the command header field contained in the converted message, and performing processing in accordance with a command indicated by the command header field.

5. A message processing method comprising:

a first step of receiving a message;

a second step of identifying a message format of the message received in the first step; and a third step of decoding a command of the message received in the first step on the basis of the message format identification result obtained in the second step, and performing processing in accordance with the decoded command; wherein the second step includes the fourth step of identifying a specific one of a first message format containing a command header field and data field and a second message format containing a command header field, encrypted data field, and auxiliary data field for guaranteeing the encrypted data field to which the message received in the first step corresponds; and the third step includes the fifth step of, when it is determined in the fourth step that the received message corresponds to the first message format, decoding the command header field contained in the received message, and performing processing in accordance with a command indicated by the command header field, and the sixth step of, when it is determined in the fourth step that the received message corresponds to the second message format, verifying the encrypted data field contained in the received message on the basis of the auxiliary data field contained in the received message, decrypting the encrypted data field provided that the encrypted data is verified, converting the received message into the first message format, decoding the command header field contained in the converted message, and performing processing in accordance with a command indicated by the command header field.

6. A message processing method comprising:

a first step of receiving a message;

a second step of identifying a message format of the message received in the first step; and a third step of decoding a command of the message received in the first step on the basis of the message format identification result obtained in the second step, and performing processing in accordance with the decoded command; wherein the second step includes the fourth step of identifying a specific one of a first message format containing a command header field and data field, a second message format containing a command header field and encrypted data field, a third message format containing a command header field, data field, and auxiliary data field for guaranteeing validity of the encrypted data field, a fourth message format containing a command header field, encrypted data field, and auxiliary data field for guaranteeing the encrypted data field to which the message received in the first step corresponds; and the third step includes the fifth step of, when it is determined in the fourth step that the received message corresponds to the first message format, decoding the command header field contained in the received message, and performing processing in accordance with a command indicated by the command header field, the sixth step of, when it is determined in the fourth step that the received message corresponds to the second message format, decrypting the encrypted data field contained in the received message, converting the received message into the first message format, decoding the command header field contained in the converted message, and performing processing in accordance with a command indicated by the command header field, the seventh step, when it is determined in the fourth step that the received message corresponds to the third message format, verifying the data field contained in the received message on the basis of the auxiliary data field contained in the received message, converting the received message into the first message format provided that the data field is verified, decoding the command header field contained in the converted message, and performing processing in accordance with a command indicated by the command header field, and the eighth step of, when it is determined in the fourth step that the received message corresponds to the fourth message format, verifying the encrypted data field contained in the received message on the basis of the auxiliary data field contained in the received message, decrypting the encrypted data field provided that the encrypted data is verified, converting the received message into the first message format, decoding the command header field contained in the converted message, and performing processing in accordance with a command indicated by the command header field.

* * * * *